(12) United States Patent
Ong (10) Patent No.: US 11,115,384 B2
(45) Date of Patent: Sep. 7, 2021

(54) WALLED GARDEN SYSTEM WITH CLEARED IPS LIST AUTOMATICALLY GENERATED FROM DNS QUERIES

(71) Applicant: Guest Tek Interactive Entertainment Ltd., Calgary (CA)

(72) Inventor: David T. Ong, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 176 days.

(21) Appl. No.: 15/796,382

(22) Filed: Oct. 27, 2017

(65) Prior Publication Data

US 2018/0124016 A1 May 3, 2018

Related U.S. Application Data

(60) Provisional application No. 62/415,163, filed on Oct. 31, 2016.

(51) Int. Cl.
*H04L 29/06* (2006.01)
*H04L 29/12* (2006.01)

(52) U.S. Cl.
CPC ...... *H04L 63/0236* (2013.01); *H04L 61/1511* (2013.01); *H04L 63/0263* (2013.01); *H04L 63/0281* (2013.01); *H04L 63/101* (2013.01)

(58) Field of Classification Search
CPC ............. H04L 63/0236; H04L 63/0263; H04L 63/0281; H04L 63/101; H04L 61/1511
See application file for complete search history.

(56) References Cited

U.S. PATENT DOCUMENTS

| 7,849,502 | B1* | 12/2010 | Bloch ................. H04L 63/168 726/11 |
| 8,448,231 | B2 | 5/2013 | Ong |
| 9,363,236 | B2 | 6/2016 | Ong |
| 9,756,019 | B2 | 9/2017 | Warrick et al. |
| 2005/0235044 | A1* | 10/2005 | Tazuma ............ H04L 29/12066 709/217 |
| 2012/0084423 | A1* | 4/2012 | McGleenon ........ H04L 61/1511 709/223 |
| 2014/0344890 | A1* | 11/2014 | Warrick .............. H04L 63/0281 726/1 |
| 2017/0222974 | A1* | 8/2017 | Cathrow ............. H04L 61/1511 |
| 2017/0295451 | A1* | 10/2017 | Kim ........................ H04W 4/60 |

* cited by examiner

*Primary Examiner* — Joseph P Hirl
*Assistant Examiner* — Chi D Nguy
(74) *Attorney, Agent, or Firm* — ATMAC Patent Services Ltd.; Andrew T. MacMillan (57) ABSTRACT

A walled garden system includes a firewall controlling access between a first network and a second network at least by allowing connection requests originating from a user device on the first network to a destination IP address on the second network in response to determining that the destination IP address matches a cleared IP address on a cleared IP addresses list. A controller receives a domain name service (DNS) reply from a DNS server on the second network, and determines whether a domain name specified within the DNS reply matches a cleared domain name on a cleared domain names list. In response to determining that the domain name specified within the DNS reply matches the cleared domain name on the cleared domain names list, the controller adds a resolved IP address specified in the DNS reply to the cleared IP addresses list as a new cleared IP address.

20 Claims, 3 Drawing Sheets

WALLED GARDEN SYSTEM WITH CLEARED IPS LIST AUTOMATICALLY GENERATED FROM DNS QUERIES

CROSS-REFERENCE TO RELATED APPLICATIONS

This application claims the benefit of priority of U.S. Provisional Application No. 62/415,163 filed Oct. 31, 2016, which is incorporated herein by reference.

BACKGROUND OF THE INVENTION

(1) Field of the Invention

The invention pertains generally to limiting access to a computer network. More specifically, the invention relates to an electronic walled garden providing access to one or more cleared destination domain names.

(2) Description of the Related Art

For a variety of reasons, network providers may require users to log in before allowing them to access websites and other hosts on the Internet. Logging in may involve one or more of payment, authentication, and/or registration. However, it may also be desirable to provide free access to certain network destinations for guest users who have not logged in. For example, a hotel may desire a limited number of external web sites such as a hotel reservation website and a tour operator website to be freely accessible from laptops and other web browsing devices within the hotel even for guests who have not logged in.

A walled garden is a well-known concept allowing a network administrator to limit access to only some external websites. Walled gardens typically include an administrator-specified list of external websites which are to be freely available, referred to herein as a cleared sites list, and these sites are specified by either IP addresses or hostnames. Before a user has logged in, the walled garden ensures that only external sites listed on the administrator-specified cleared sites list may be accessed by the user.

U.S. Pat. No. 8,448,231 issued May 21, 2013 and U.S. Pat. No. 9,363,236 issued Jun. 7, 2016 describe, among other improvements, a prior art smart walled garden system by the inventor of the present application that allows an administrator to clear all sub domains of an external website specified by domain name regardless of how many IP addresses are associated with these locations and without knowing in advance all the exact sub domains. These two patents are incorporated herein by reference.

Although the prior smart walled garden system and improvements described in the above two patent documents work well for websites accessed utilizing the Hypertext Transfer Protocol (HTTP), browser certificate errors are encountered when a user attempts to use HTTP Secure (HTTPS) to access a new website, and this happens even if the requested domain name matches a cleared hostname. Likewise, since websites often change their Internet Protocol addresses, this causes problems for all cleared sites except for those that utilize plain HTTP. For instance, when an HTTPS domain is run by a content delivery network (eg: Akamai) or cloud provider, the IP address of the site may frequently change. Each time the IP address of an HTTPS website changes, browser certificate errors are encountered by users. The browser certificate errors are caused because the new IP address is not yet cleared by the firewall and therefore the smart walled garden controller will accept the HTTPS connection request itself, but the controller does not possess the proper certificate for the requested URL. Furthermore, cleared domains that don't use HTTP or HTTPS and instead use other networking protocols such as Telnet, FTP, Ping, etc. are not made accessible by the smart walled garden system even when the administrator adds the hostname of these sites to the cleared sites list.

BRIEF SUMMARY OF THE INVENTION

According to an exemplary embodiment of the invention there is disclosed a new domain name system (DNS) proxy based walled garden to allow user devices to access cleared domain names for any allowed protocol. All DNS traffic from user devices is redirected to a DNS controller acting as a DNS proxy. This controller reads all DNS replies and matches any hostname lookups with the hostnames of the configured cleared hosts (including matching wildcards). If the controller finds a match, it checks to see if the DNS reply's IP addresses have been cleared through the firewall yet. If not, it clears the IP addresses through the firewall before it returns the DNS reply back to the guest device. The user device is then able to Ping/FTP/HTTP/HTTPS/Telnet/ etc. to the cleared domain name without any hindrance.

According to an exemplary embodiment of the invention there is disclosed a walled garden system including a storage device storing a cleared internet protocol (IP) addresses list and a cleared domain names list. A firewall controls access between a first network and a second network, and a controller is coupled to the storage device and the firewall. The firewall is operable to control access between the first network and the second network at least by allowing connection requests originating from a user device on the first network to a destination IP address on the second network in response to the firewall determining that the destination IP address matches a cleared IP address on the cleared IP addresses list. The controller is operable to receive a domain name service (DNS) reply from a DNS server on the second network, and determine whether a domain name specified within the DNS reply matches a cleared domain name on the cleared domain names list. In response to determining that the domain name specified within the DNS reply matches the cleared domain name on the cleared domain names list, the controller is operable to add a resolved IP address specified in the DNS reply to the cleared IP addresses list as a new cleared IP address.

According to an exemplary embodiment of the invention there is disclosed a method of providing a walled garden. The method includes storing a cleared internet protocol (IP) addresses list and a cleared domain names list, and controlling access between a first network and a second network at least by allowing connection requests originating from a user device on the first network to a destination IP address on the second network in response to determining that the destination IP address matches a cleared IP address on the cleared IP addresses list. The method further includes receiving a domain name service (DNS) reply from a DNS server on the second network, and determining whether a domain name specified within the DNS reply matches a cleared domain name on the cleared domain names list. The method further includes, in response to determining that the domain name specified within the DNS reply matches the cleared domain name on the cleared domain names list, adding a resolved IP address specified in the DNS reply to the cleared IP addresses list as a new cleared IP address.

According to an exemplary embodiment of the invention there is disclosed a walled garden system including one or more storage devices storing a cleared internet protocol (IP) addresses list, a cleared domain names list, and a plurality of software instructions; and one or more processors coupled to the one or more storage devices. By the one or more processors executing the software instructions loaded from the one or more storage devices, the one or more processors are operable to control access between a first network and a second network at least by allowing connection requests originating from a user device on the first network to a destination IP address on the second network in response to determining that the destination IP address matches a cleared IP address on the cleared IP addresses list. The one or more processors are further operable to receive a domain name service (DNS) reply from a DNS server on the second network, and determine whether a domain name specified within the DNS reply matches a cleared domain name on the cleared domain names list. The one or more processors are further operable to, in response to determining that the domain name specified within the DNS reply matches the cleared domain name on the cleared domain names list, add a resolved IP address specified in the DNS reply to the cleared IP addresses list as a new cleared IP address.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
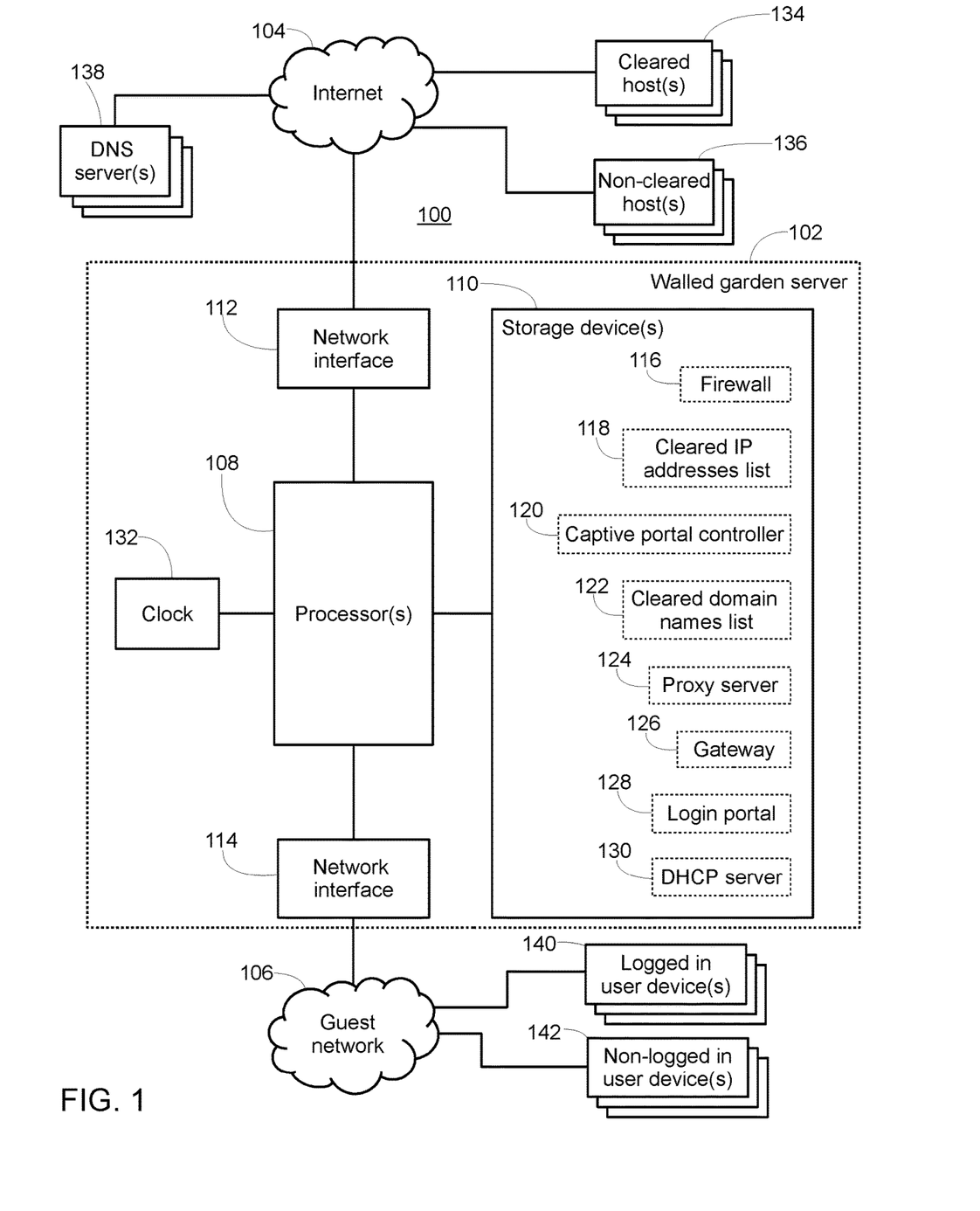
FIG. 1 shows a walled garden system that automatically generates a cleared IPs list from domain name service (DNS) queries according to an exemplary embodiment.

FIG. 1 shows a walled garden system 100 according to an exemplary embodiment. The system 100 includes a walled garden server 102 positioned between a first network such as a guest network 106 and a second network such as the Internet 104. The guest network 106 may be a local area network (LAN) installed at a hospitality establishment and may include wired access ports and wireless access points allowing guests of the hospitality establishment to access an external network such as the Internet 104 assuming permission is granted by the walled garden server 102.

In this embodiment, the walled garden server 102 is a computer server including one or more processors 108 coupled to a storage device 110, a first network interface 114, and a second network interface 112. The storage device 110 may be formed by any combination of storage devices including but not limited to flash memory, random access memory (RAM), and flash memory device(s), for example. The storage device 110 stores therein a number of software applications and data utilized by the software applications. Specifically, in this embodiment, the walled garden server 102 includes computer software instructions for acting as a firewall 116, a cleared internet protocol (IP) addresses list 118, computer software instructions for acting as a captive portal controller 120, a cleared domain names list 122, computer software instructions for acting as a proxy server 124, computer software instructions for acting as a gateway 126, computer software instructions for acting as a login portal 128, and computer software instructions for acting as a dynamic host configuration protocol (DHCP) server 130. Further details of these components 116, 118, 120, 122, 124, 126, 128, 130 are provided below.

The walled garden server 102 further includes a clock 132 coupled to the one or more processors 108. The clock 132 may be implemented by a real time clock chip or timer that keeps track of the current time in any desired resolution (date, day, hours, minutes, etc.) and that is kept synchronized by the one or more processors 108 with one or more time servers available on the Internet 104. In the following description, the plural form of the word "processors" will be utilized for the one or more processors 108 of the walled garden server 102 as it is common for the CPU of modern server to have multiple processors 108 (sometimes also referred to as cores); however, it is to be understood that a single processor 108 may also be configured to perform the described functionality of the walled garden server 102 in other implementations.

For illustration purposes, FIG. 1 also shows one or more domain name service (DNS) servers 138 provided on the Internet along with a group of one or more cleared host(s) 134 and a group of one or more non-cleared host(s) 136. The two groups of hosts 134, 136 represent computer servers providing various services accessible over the Internet 104. The difference between the cleared hosts 134 and the non-cleared hosts 136 is whether user authentication is first required before access will be allowed from the guest network 106. In particular, non-cleared hosts 136 are only accessible to the logged in user devices 140. Examples include video streaming services and other entertainment sites. In contrast, the cleared hosts 134 are accessible in this embodiment by both logged in user devices 140 and non-logged in user devices 142. For example, a limited number of cleared hosts 134 such as a hotel reservation website and a tour operator website may be desired to be freely accessible from laptops and other user devices within the hotel even for guests who have not yet successfully logged in at login portal 128.

In this embodiment, the cleared hosts 134 are specified by a cleared domain names list 122. Table 1 provides an example of a cleared domain names list 122:

TABLE 1

Example of a cleared domain names list 122
Domain name descriptor

*.cnn.com
*.gmail.com
*.mail.yahoo.com
*.reservations.marriott.com
www.marriott.com
*.travel-tours.com
example*.com
request?.example.com
Etc.

In this embodiment, the cleared hosts 134 are any host that has a domain name that matches one of the cleared domain names on the above list 122. As shown, wildcards such as "*" and/or "?" may be utilized within the cleared domain names list 122 to facilitate specifying a plurality of domains and/or clearing entire subdomains for access. For the purposes of this description, the non-cleared hosts 136 are all the other domains that do not match one of the cleared domain names on the cleared domain names list 122.

In this embodiment, the walled garden server 102 also acts as the default gateway 126 on the guest network 106. This may be done by the DHCP server 130 providing the IP address of the walled garden server 102 as the default gateway to all new user devices 140, 142. In this way, when a user device 140, 142 requests a connection with a host 134, 136 on the Internet 104, the walled garden server 102 and in particular the default gateway 126 and firewall software modules 116 running thereon will receive the connection request.

For all connection requests originating from the guest network 106 that have a destination IP address on the Internet 104, the firewall 116 will make a decision to either allow or block the connection request. This decision is performed according to a plurality of dynamically configured firewall rules. In particular, for a connection request that originates from a non-logged in user device 142 (i.e., a user device with a source MAC and/or IP address that does not correspond to one of the logged in user devices 140), the firewall will by default block the outgoing connection request unless the destination IP address of the outgoing connection request matches a cleared IP address on the cleared IP addresses list 118. Table 2 shows an example of a cleared IP address list 118:

TABLE 2

Example of a cleared IP addresses list 118

| Cleared IP address | Last seen (DATE TIME) |
|---|---|
| 151.101.0.73 | 2016-10-19 14:22:04 |
| 216.58.192.133 | 2016-10-19 14:22:04 |
| 98.138.79.21 | 2016-10-18 21:22:41 |
| 208.73.210.214 | 2016-10-18 10:23:52 |
| 69.192.206.182 | 2016-10-19 10:24:18 |
| 69.172.201.153 | 2016-10-18 22:24:41 |
| 209.44.98.50 | 2016-10-19 03:24:58 |
| 209.171.44.153 | 2016-10-19 03:24:58 |
| Etc. | Etc. |

Figure 2:
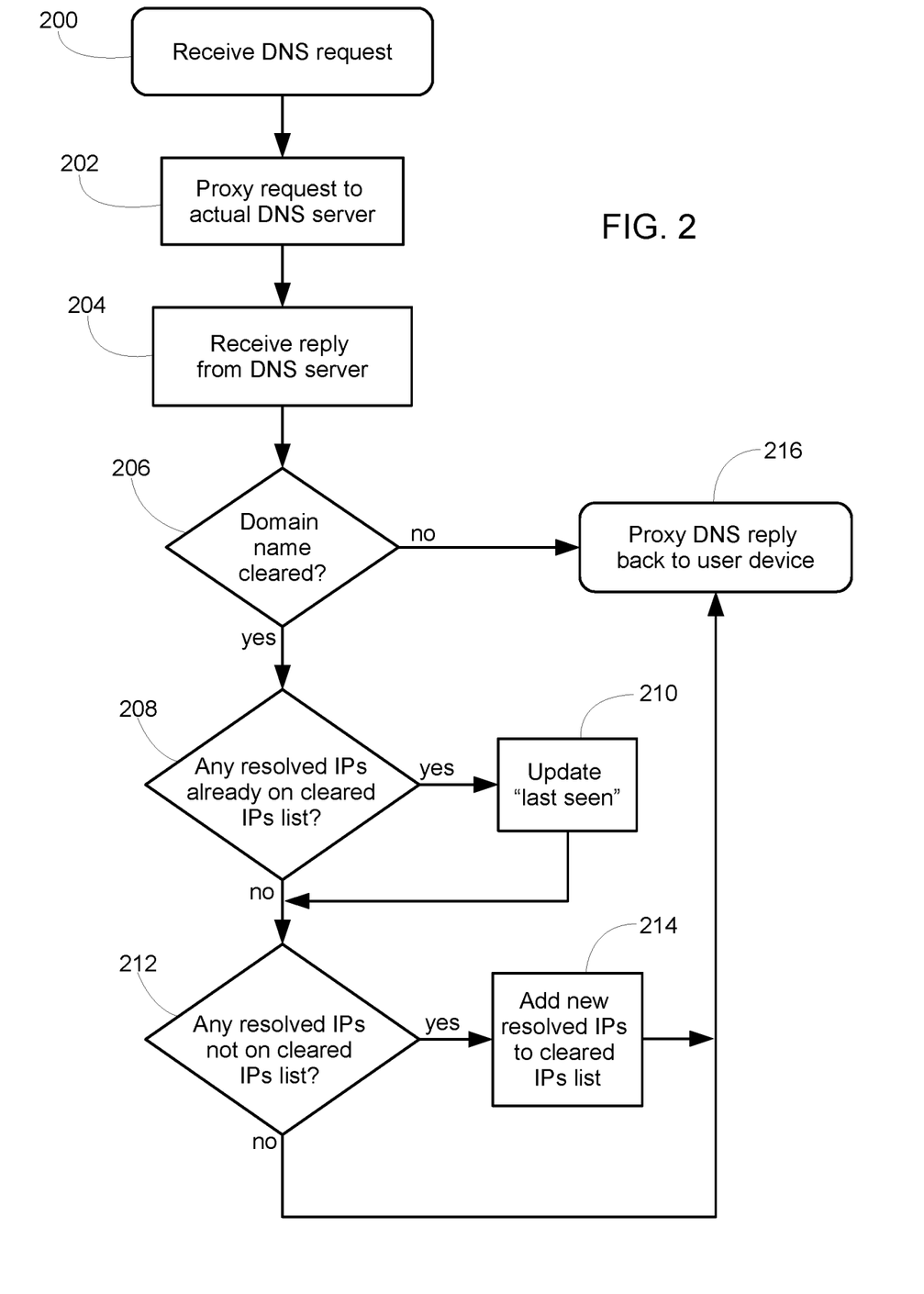
FIG. 2 shows a flowchart of operations performed by the walled garden server of FIG. 1 to proxy DNS queries according to an exemplary embodiment.

FIG. 2 shows a flowchart of operations performed by the walled garden server 102 of FIG. 1 to add new cleared IP addresses to the cleared IP addresses 118 list while proxying DNS queries according to an exemplary embodiment. The steps of FIG. 2 are not restricted to the exact order shown, and, in other embodiments, shown steps may be omitted or other intermediate steps added. In this embodiment, the processors 108 execute software instructions for the captive portal controller 120 loaded from the storage device 110 in order to cause the walled garden server 102 to perform the illustrated steps.

The process begins at step 200 when the captive portal controller 120 receives a DNS request from a non-logged in user device 142. This may occur as a result of the captive portal server 102 also being set as the primary/secondary DNS server during the prior DHCP configuration process for the user device 142. In another example, the controller 120 may intercept the DNS request from the non-logged in user device 142 as a result of the captive portal server 102 being the default gateway 126 on the guest network 106. The controller 120 may recognize DNS requests by watching for user datagram protocol (UDP) and/or transmission control protocol (TCP) traffic on port 53, for example.

At step 202, the controller 120 proxies the DNS request to an actual DNS server such as one of the DNS servers 138 on the Internet 104. The proxy operation may be performed by the proxy server 124 running on the walled garden server 102 or the proxy functionality may be built in to the controller 120 itself. As is understood by people familiar with computer networking, DNS proxying such as done at this step 202 is often referred to as DNS forwarding.

At step 204, the controller 120 receives a DNS reply from the DNS server to which the proxied request was sent at step 202.

At step 206, the controller 120 checks the DNS reply in order to determine whether the resolved domain name specified within the DNS reply matches a cleared domain name on the cleared domain names list 122. Again, wildcards used when specifying cleared domain names on the list 122 may be taken into account at this step. When a match is found, this means the DNS reply pertains to a cleared domain name (i.e., one of the cleared hosts 134) so control proceeds to step 208 to make sure access is allowed. Alternatively, if no match is found, this means the DNS reply is related to a non-cleared host 136 so control proceeds to step 216.

At step 208, the controller 120 checks whether any of the resolved IP addresses included in the DNS reply are already on the cleared IP addresses list 118. After the system 100 is up and running for a period of time, it is highly likely that multiple DNS requests will be encountered for a same host domain name such as that of a popular search engine or other web service. In this way, the controller 120 may find that one or more of the resolved IP addresses included in the DNS reply received at step 204 are already included as cleared IP addresses on list 118. In this case, control proceeds to step 210. Alternatively, if none of the resolved IP address(es) included in the DNS reply received at step 204 are already on the cleared IP addresses list 118, control proceeds to step 212.

At step 210, the controller 120 updates the "last seen" value to be the current time for each of the resolved IP address(es) that are already included on the cleared IP addresses list 118.

At step 212, the controller 120 checks whether there are any newly resolved IP addresses included in the DNS reply that are not already on the cleared IP addresses list 118. This may occur, for example, after a new domain name is requested for the first time, or after a previously resolved domain name changes its IP address. When there is a new IP address in the DNS reply that is not already on the cleared IP addresses list 118, control proceeds to step 214; alternatively, control proceeds to step 216.

At step 214, the controller 120 adds to the cleared IP addresses list 118 each of the newly resolved IP address(es) in the DNS reply received at step 204 that are not already included on the cleared IP addresses list 118. The "last seen" value for each of these newly added IP addresses is set to be the current time.

At step 216, the controller 120 proxies the DNS reply received at step 204 back to the non-logged in user device 142 that originally made the DNS request received at step 200.

An exemplary advantage of the flowchart shown in FIG. 2 is that a non-logged in user device 142 can be provided access to cleared hosts 134 specified by domain name on the cleared domain names list 122. The above process can be utilized to allow access for any protocol as long as a DNS request is issued by the non-logged in user device 142 for the domain name of the cleared host 134. Furthermore, since the controller 120 proxies the DNS request and reply between the user device 142 and the DNS server 138, the controller 120 can make sure that all newly cleared IP address(es) are added to the cleared IP addresses list 118 at step 214 prior to providing the DNS reply to the user device 142. In this way, when the user device 142 subsequently makes a connection request to one of the resolved IP addresses specified in the DNS reply, the firewall 116 will directly allow the connection because the resolved IP address has already been added to the cleared IP addresses list 118 by the controller 120.

Figure 3:
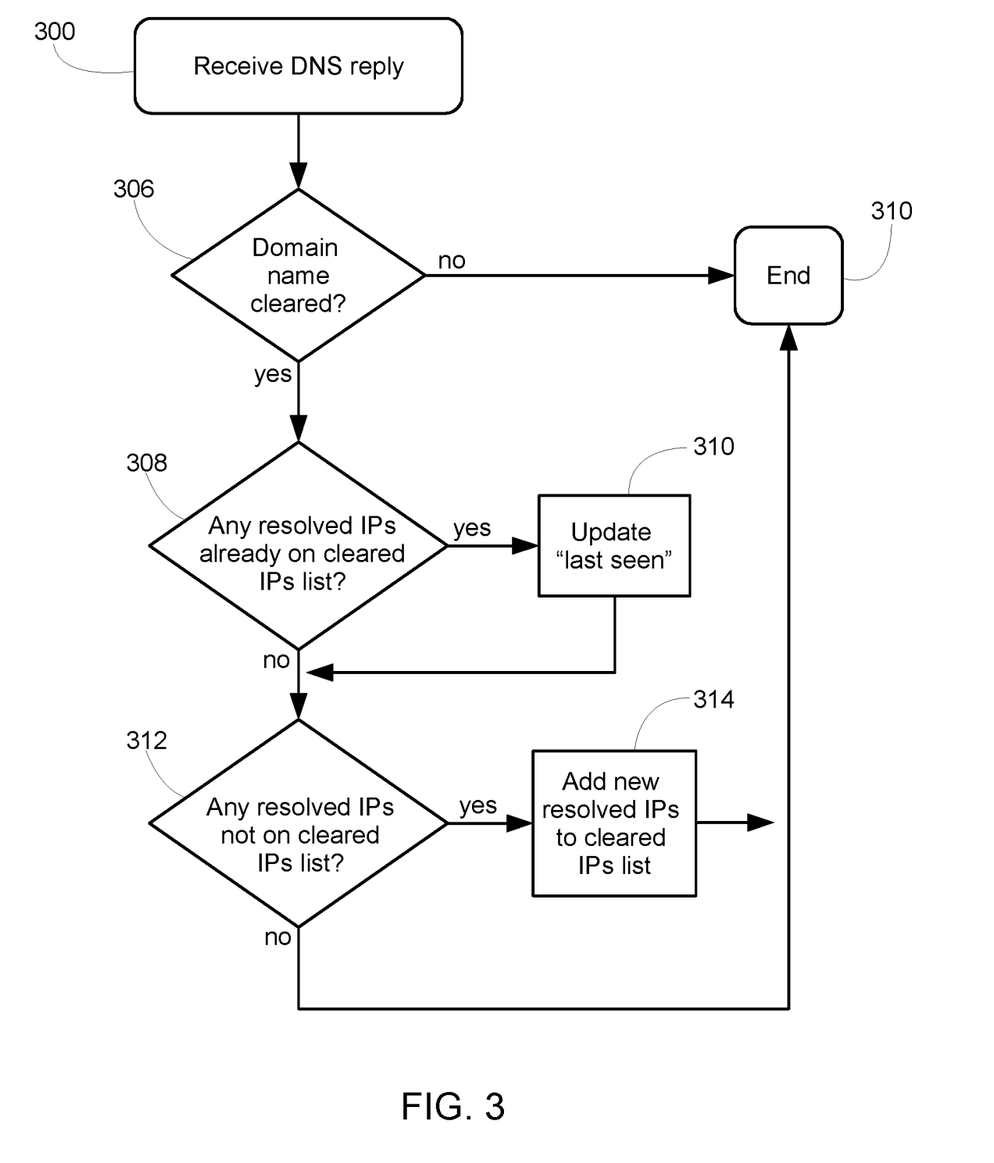
FIG. 3 shows a flowchart of operations performed by the walled garden server of FIG. 1 to listen to DNS transactions according to an exemplary embodiment.

FIG. 3 shows a flowchart of operations performed by the walled garden server 102 of FIG. 1 to add new cleared IP addresses to the cleared IP addresses 118 list without proxying DNS queries according to an exemplary embodiment. The steps of FIG. 3 are not restricted to the exact order shown, and, in other embodiments, shown steps may be omitted or other intermediate steps added. In this embodiment, the processors 108 execute software instructions for the captive portal controller 120 loaded from the storage device 110 in order to cause the walled garden server 102 to perform the illustrated steps.

The process of FIG. 3 is very similar to that of FIG. 2 however the starting condition and the ending condition are different.

The process of FIG. 3 begins at step 300 when the captive portal controller 120 receives a DNS reply. Unlike in the previous example of FIG. 2, in FIG. 3 the controller 120 does not proxy DNS queries to any DNS servers 138. Instead, the controller 120 simply examines network traffic to detect when DNS replies are received. This may be done by the controller 120 watching for UDP and/or TCP traffic on port 53, for example. Non-logged in user devices 142 may be authorized to communicate with one or more external DNS servers 138 by permanently adding the fixed IP address of the external DNS server 138 to the cleared IP addresses list 118. Likewise, one or more local DNS servers may be integrated into the walled garden server 102 itself such as by running a local DNS server module (not shown) loaded from storage device 110. In yet another example, a local DNS server may be provided by another server (not shown) on the guest network 106.

After the controller 120 detects a DNS reply at step 300, control proceeds to step 306. Steps 306, 308, 310, 312, 314 are similar and correspond directly to steps 206, 208, 210, 212, 214; thus a repeated description is omitted. However, as shown in FIG. 3, steps 306 and 314 in this embodiment proceed to ending step 310 where no further action is taken by the controller 120. This is different than in the previous example of FIG. 2 where the final action by the controller 120 was to proxy the DNS reply back to the originating user device 142. In FIG. 3, the originating user device 142 automatically receives the DNS reply as a result of the fact the user device 142 and the DNS server 138 are directly communicating with each other. Although, the DNS traffic may pass through the firewall 116 and/or the default gateway 126 in order to traverse from the guest network 106 to the Internet 104 and vice versa, the destination IP address of the DNS reply detected at step 300 will be the IP address assigned to the originating user device 142 and therefore there is no requirement for the controller 120 to take any further action at step 310 to make sure the originating user device 142 receives the DNS reply.

An exemplary advantage of the flowchart shown in FIG. 3 is that a non-logged in user device 142 is still provided access to cleared hosts 134 specified by domain name on the cleared domain names list 122. Additionally, the requirements on the walled garden server 102 are reduced because the controller 120 does not need to act as a DNS proxy. Like the process of FIG. 2, the process of FIG. 3 can also be utilized to allow access for any protocol as long as a DNS request is issued by the non-logged in user device 142 for the domain name of the cleared host 134. However, because the controller 120 cannot guarantee that all newly cleared IP address(es) will be added to the cleared IP addresses list 118 at step 314 prior to the DNS reply being received and acted upon by the user device 142, it may be the case that the user device 142 will make a connection request to one of the newly resolved IP addresses before that destination IP address is added to the cleared IP addresses list 118 by the controller 120. If this happens, the firewall 118 will block the connection request since the requesting user device 142 is not logged in. However, by the time the requesting user device 142 retries the connection request, the newly resolved IP address should be added to the cleared IP addresses list 118 by the controller 120 at step 314 and the retried connection request will be allowed by the firewall 116.

In order to automatically clean the cleared IP addresses list 118, the controller 120 in some embodiments periodically deletes from the list 118 all IP addresses that have a "last seen" value older than a predetermined expiry duration such as forty-eight hours. Of course, any desired expiry duration may be utilized. The result of the automatic expiry based on the "last seen" value for each IP address is that older IPs that have not recently been resolved in any DNS reply are deleted. In some cases, a cleared IP address may not be resolved because the associated cleared domain name has changed its IP address(es) and no longer utilizes that cleared IP address. Occasionally pruning the cleared IP addresses list 118 prevents old and unused IP addresses from accumulating without burdening a human administrator to manually check any of these IP addresses. In the event that a valid IP address is deleted from the cleared IP addresses list 118, for example because no user has performed a DNS lookup on the associated cleared domain name within the predetermined expiry domain, the controller 120 will simply re-add that cleared IP address back to the cleared list 118 as soon as a future user makes a new DNS request for that domain name.

In some embodiments, rather than storing the current time as a last seen value in the cleared IP addresses list 118, an expiry date/time is instead stored for each IP address. Storing the expiry time for each cleared IP address rather than the last seen time allows each IP address in the cleared list 118 to have a different expiry duration. In some embodiments, the controller 120 sets the expiry time to match the time-to-live (TTL) value specified in the DNS reply providing that IP address. In other words, steps 210 and 214 of FIG. 2 and corresponding steps 310 and 314 of FIG. 3 are modified so that instead of storing the last seen time, the controller 120 stores an expiry time being the TTL value for the IP address. In yet other embodiments, the expiry time stored by the controller is greater than or equal to the TTL. In these embodiments, the controller 120 will delete IP addresses from the cleared IP addresses list 118 at the same time or after that guest devices will start performing new DNS requests for the domain name to which the IP address was resolved. This is particularly beneficial to avoid the controller 120 deleting a cleared IP address from the cleared list 118 prior to the TTL expiring, which might result in non-cleared guest device being both blocked from accessing what was previously a cleared IP address and also not performing a new DNS request because the TTL on that IP address has not yet expired.

In an exemplary embodiment, a walled garden system includes a firewall controlling access between a first network and a second network at least by allowing connection requests originating from a user device on the first network to a destination IP address on the second network in response to determining that the destination IP address matches a cleared IP address on a cleared IP addresses list. A controller receives a domain name service (DNS) reply from a DNS server on the second network, and determines whether a domain name specified within the DNS reply matches a cleared domain name on a cleared domain names list. In response to determining that the domain name specified within the DNS reply matches the cleared domain name on the cleared domain names list, the controller adds a resolved IP address specified in the DNS reply to the cleared IP addresses list as a new cleared IP address.

Although the invention has been described in connection with preferred embodiments, it should be understood that various modifications, additions and alterations may be made to the invention by one skilled in the art without departing from the spirit and scope of the invention. For example, although the above description has involved an example walled garden at a hotel, the present invention is equally applicable to any hospitality related location or service wishing to limit website access to a subset of websites. Examples of hospitality locations include but are not limited to hotels, motels, resorts, hospitals, apartment/ townhouse complexes, restaurants, retirement centres, cruise ships, busses, airlines, shopping centres, passenger trains, etc. Examples of Internet browsing devices include set-top boxes, mobile phones, laptop computers, notebook computers, desktop computers, tablet computers, personal digital assistants (PDAs), etc. Similarly, the present invention is also useful outside the hospitality industry such as when utilized by a parent to limit access to approved websites for a child, for example. In general, the techniques of the present intention may be included in any walled garden application.

In another example modification, it is not a requirement that DNS servers be on an external network such as the Internet 104, the system 100 may also be utilized with DNS servers in the captive portal server 102 and/or on the guest network 106.

DNS replies received at steps 200 and 300 may be received directly or indirectly. This includes the controller 120 intercepting DNS replies that are addressed to other devices different than the controller 120. Alternatively, the DNS reply may be directly addressed to the controller 120.

In another example modification, the captive portal system 100 described herein may be utilized in conjunction with the improved smart walled gardens described in above referenced U.S. Pat. Nos. 8,448,231 and 9,363,236. For instance, the system 100 described herein may be utilized to provide access to protocols other than HTTP and HTTPS and to avoid browser security warnings for HTTPS hosts after their IP addresses change or are newly added to cleared sites list 118. Likewise, the improved smart walled gardens described in U.S. Pat. Nos. 8,448,231 and 9,363,236 may be utilized to allow cleared hosts 134 on the cleared domain names list 122 to run websites that incorporate content from other non-cleared hosts 136. By the controller 120 also checking the referrer header of the HTTP request as described in more details in the above patents, content from non-cleared hosts 136 can still be freely accessed by non-logged in user devices 142 but only when this content is incorporated into (i.e., referred to by) a cleared host 134.

In yet another example modification, the captive portal system 100 described herein in FIG. 2 may be modified at step 216 to only proxy the DNS reply back to a non-logged in user device 142 in response to the domain name being cleared at step 206. In other words, step 216 is modified to check whether control came to step 216 as a result of the "no" branch from step 206 and if yes to reply to the non-logged in user device 142 with a fake (poisoned) DNS reply providing the IP address of the login portal 128 as the resolved IP address of the requested domain name. In this way, the captive portal system 100 described herein can be utilized in conjunction with the teachings of US Patent Application Publication Number 20140344890 entitled, "DNS-BASED CAPTIVE PORTAL WITH INTEGRATED TRANSPARENT PROXY TO PROTECT AGAINST USER DEVICE CACHING INCORRECT IP ADDRESS" published on Nov. 20, 2014, which is incorporated herein by reference. Likewise, the techniques described in the teachings of that patent can also be utilized for the controller 120 to also act as a transparent proxy for HTTP and HTTPS traffic received from a user device that has cached the IP address of the login portal 128 as the IP address for another domain name.

In yet another example modification, one or more of the cleared IP addresses list 118 and/or cleared domain names list 122 may be modified to add another one or more column(s) specifying the exact port numbers and/or protocols that are to be cleared for non-logged in user devices 142. For instance, rather than allowing non-logged in user devices 142 to access to the cleared hosts 132 utilizing any desired protocol, the firewall may check the cleared IP addresses list 118 to ensure that both the requested destination IP address is a cleared IP address on the list 118 and that the requested destination port is a cleared port number. Ports may be specifically cleared for each IP address individually based on which services are run on the corresponding cleared domain name; alternatively, one or more ports limitations may apply to a plurality of cleared IP addresses for enforcement by the firewall 116.

In yet another example modification, instead of proxying/ forwarding or watching packets from a standalone captive portal server 102, the captive portal controller 120 and/or other components of the serer 102 may be integrated directly into a DNS server.

The above described flowcharts and functionality may be implemented by software executed by one or more processors operating pursuant to instructions stored on a tangible computer-readable medium such as a storage device to perform the above-described functions of any or all aspects of the access controller. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the walled garden server 102, controller 120 or any of the above-described components of system 100 as a result of executing the instructions.

In other embodiments, rather than being software modules executed by one or more processors, the above described components, flowcharts and functionality may be implemented as hardware modules configured to perform the above-described functions. Examples of hardware modules include combinations of logic gates, integrated circuits, field programmable gate arrays, and application specific integrated circuits, and other analog and digital circuit designs. Functions of single components may be separated into multiple units, or the functions of multiple components may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A walled garden system comprising:
a storage device storing a cleared internet protocol (IP) addresses list and a cleared domain names list;
a firewall controlling access between a first network and a second network; and
a controller coupled to the storage device and the firewall;
wherein the firewall is operable to control access between the first network and the second network at least by receiving one or more connection requests originating from a non-logged in user device on the first network that have a destination IP address on the second network, and directly allowing the connection requests to a pass to the destination IP address on the second network in response to the firewall determining that the destination IP address matches a cleared IP address on the cleared IP addresses list, and by blocking other connection requests originating from the non-logged in user device to an other destination IP address on the second network in response to the firewall determining that the other destination IP address does not match any cleared IP address on the cleared IP address list;
the controller is operable to receive a domain name service (DNS) reply from a DNS server on the second network;
the controller is operable to determine whether a domain name specified within the DNS reply matches a cleared domain name on the cleared domain names list; and
in response to determining that the domain name specified within the DNS reply matches the cleared domain name on the cleared domain names list, the controller is operable to add a resolved IP address specified in the DNS reply to the cleared IP addresses list as a new cleared IP address;
whereby, after the controller adds the resolved IP address to the cleared IP addresses list, the firewall is operable to allow connection requests originating from the non-logged in user device to the resolved IP address.

2. The walled garden system of claim 1, wherein the firewall is further operable to determine that the destination IP address matches the cleared IP address on the cleared IP addresses list by taking into account wild cards specified on the cleared IP addresses list.

3. The walled garden system of claim 1, wherein the controller is further operable to determine that the domain name specified within the DNS reply matches the cleared domain name on the cleared domain names list by taking into account wild cards specified on the cleared domain names list.

4. The walled garden system of claim 1, wherein the DNS reply is a reply to a previous DNS request sent by the non-logged in user device.

5. The walled garden system of claim 1, wherein:
the controller is further operable to receive a DNS request sent by the non-logged in user device, and proxy the DNS request to the DNS server as a proxied DNS request; and
the DNS reply is a reply to the controller in response to the proxied DNS request sent by the controller.

6. The walled garden system of claim 1, further comprising a dynamic host configuration protocol (DHCP) server operable to inform the non-logged in user device of a default DNS server being an IP address utilized by the controller.

7. The walled garden system of claim 1, wherein the controller is integrated within a device acting as a default gateway of the first network.

8. The walled garden system of claim 1, wherein the controller is further operable to add a plurality of resolved IP addresses specified in the DNS reply to the cleared IP addresses list as new cleared IP addresses.

9. The walled garden system of claim 1, wherein the controller is further operable to:
track a last seen time for each cleared IP address on the cleared IP addresses list, the last seen time of a particular cleared IP address corresponding to a time the particular cleared IP address was last specified in a DNS reply as a resolved IP address of a cleared domain name on the cleared domain names list; and
periodically delete cleared IP addresses on the cleared IP addresses list that have a last seen time older than a predetermined expiry duration.

10. The walled garden system of claim 1, wherein the controller is further operable to:
track an expiry time for each cleared IP address on the cleared IP addresses list, the expiry time of a particular cleared IP address being greater than a time-to-live specified in a DNS reply providing the particular cleared IP as a resolved IP address of a cleared domain name on the cleared domain names list; and
periodically delete cleared IP addresses on the cleared IP addresses list that have expired.

11. The walled garden system of claim 1, wherein the firewall is further operable to allow connection requests originating from the non-logged in user device to the destination IP address on the second network in response to the firewall determining that the destination IP address matches the cleared IP address on the cleared IP addresses list and that a destination port matches a cleared port.

12. The walled garden system of claim 1, wherein:
in response to determining that the domain name specified within the DNS reply matches the cleared domain name on the cleared domain names list, the controller is further operable to proxy the DNS reply from the DNS server back to the non-logged in user device; and
in response to determining that the domain name specified within the DNS reply does not match any of the cleared domain names on the cleared domain names list, the controller is further operable to reply to the non-logged in user device with a fake DNS reply providing an IP address of a login portal as the resolved IP address, thereby enabling the non-logged in user device to gain access.

13. The walled garden system of claim 1, wherein the controller is further operable to:

proxy the DNS reply from the DNS server back to the non-logged in user device after adding the resolved IP address to the cleared IP addresses list;

whereby, when the non-logged in user device subsequently makes a connection request to the resolved IP address specified in the DNS reply, the firewall will directly allow the connection request because the resolved IP address has already been added to the cleared IP addresses list by the controller.

14. A method of providing a walled garden, the method comprising:

storing a cleared internet protocol (IP) addresses list and a cleared domain names list;

controlling access between a first network and a second network at least by receiving one or more connection requests originating from a non-logged in user device on the first network that have a destination IP address on the second network, and directly allowing the connection requests to a-pass to the destination IP address on the second network in response to determining that the destination IP address matches a cleared IP address on the cleared IP addresses list, and by blocking other connection requests originating from the non-logged in user device to an other destination IP address on the second network in response to determining that the other destination IP address does not match any cleared IP address on the cleared IP address list;

receiving a domain name service (DNS) reply from a DNS server on the second network;

determining whether a domain name specified within the DNS reply matches a cleared domain name on the cleared domain names list; and in response to determining that the domain name specified within the DNS reply matches the cleared domain name on the cleared domain names list, adding a resolved IP address specified in the DNS reply to the cleared IP addresses list as a new cleared IP address;

whereby, after adding the resolved IP address to the cleared IP addresses list, connection requests originating from the non-logged in user device to the resolved IP address are allowed.

15. The method of claim 14, further comprising determining that the destination IP address matches the cleared IP address on the cleared IP addresses list by taking into account wild cards specified on the cleared IP addresses list.

16. The method of claim 14, further comprising determining that the domain name specified within the DNS reply matches the cleared domain name on the cleared domain names list by taking into account wild cards specified on the cleared domain names list.

17. The method of claim 14, further comprising adding a plurality of resolved IP addresses specified in the DNS reply to the cleared IP addresses list as new cleared IP addresses.

18. The method of claim 14, further comprising:

tracking a last seen time for each cleared IP address on the cleared IP addresses list, the last seen time of a particular cleared IP address corresponding to a time the particular cleared IP address was last specified in a DNS reply as a resolved IP address of a cleared domain name on the cleared domain names list; and periodically deleting cleared IP addresses on the cleared IP addresses list that have a last seen time older than a predetermined expiry duration.

19. The method of claim 14, further comprising:

tracking an expiry time for each cleared IP address on the cleared IP addresses list, the expiry time of a particular cleared IP address being greater than a time-to-live specified in a DNS reply providing the particular cleared IP as a resolved IP address of a cleared domain name on the cleared domain names list; and periodically deleting cleared IP addresses on the cleared IP addresses list that have expired.

20. A walled garden system comprising:

one or more storage devices storing a cleared internet protocol (IP) addresses list, a cleared domain names list, and a plurality of software instructions; and one or more processors coupled to the one or more storage devices;

wherein, by the one or more processors executing the software instructions loaded from the one or more storage devices, the one or more processors are configured to:

control access between a first network and a second network at least by receiving one or more connection requests originating from a non-logged in user device on the first network that have a destination IP address on the second network, and directly allowing the connection requests to pass to the destination IP address on the second network in response to determining that the destination IP address matches a cleared IP address on the cleared IP addresses list, and by blocking other connection requests originating from the non-logged in user device to an other destination IP address on the second network in response to determining that the other destination IP address does not match any cleared IP address on the cleared IP address list;

receive a domain name service (DNS) reply from a DNS server on the second network;

determine whether a domain name specified within the DNS reply matches a cleared domain name on the cleared domain names list; and in response to determining that the domain name specified within the DNS reply matches the cleared domain name on the cleared domain names list, add a resolved IP address specified in the DNS reply to the cleared IP addresses list as a new cleared IP address;

whereby, after the resolved IP address is added to the cleared IP addresses list, the one or more processors are configured to allow connection requests originating from the non-logged in user device to the resolved IP address.

* * * * *